United States Patent [19]
Kleinschmidt

[11] 4,001,677
[45] Jan. 4, 1977

[54] DEVICE FOR THE ELECTRICAL DETERMINATION OF TWO-DIMENSIONAL CO-ORDINATES OF A POINT

[75] Inventor: Peter Kleinschmidt, Munich, Germany

[73] Assignee: Siemens Aktiengesellschaft, Berlin & Munich, Germany

[22] Filed: July 2, 1975

[21] Appl. No.: 592,525

[30] Foreign Application Priority Data

July 5, 1974 Germany ............... 2432324

[52] U.S. Cl. .................. 324/65 R; 324/64
[51] Int. Cl.² .......................... G01R 27/02
[58] Field of Search .......... 324/65 R, 65 P, 64

[56] References Cited

FOREIGN PATENTS OR APPLICATIONS 1,121,740  7/1968  United Kingdom ........... 324/65 R Primary Examiner—Stanley T. Krawczewicz
Attorney, Agent, or Firm—Hill, Gross, Simpson, Van Santen, Steadman, Chiara & Simpson

[57] ABSTRACT

A device for the electrical determination of two-dimensional coordinates of a point employs a plate and a scanning device. The plate is in the form of a resistance layer comprising material having a given electrical resistance which carries contact strips. Two of the contact strips may, in each case, be connected to different potentials of an electric voltage source. A potential which may be tapped at a point of the plate by means of a scanning device represents a gauge for the relative position of the point in relation to the contact strips. Varistor layers are arranged between the contact strips and the plate and at least one voltage source is provided so that the varistor layers can be connected to a voltage which is greater than a threshold potential at which the varistor layers pass from a state of low electric conductivity into a state of greatly increased conductivity.

6 Claims, 5 Drawing Figures

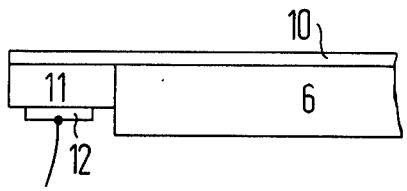
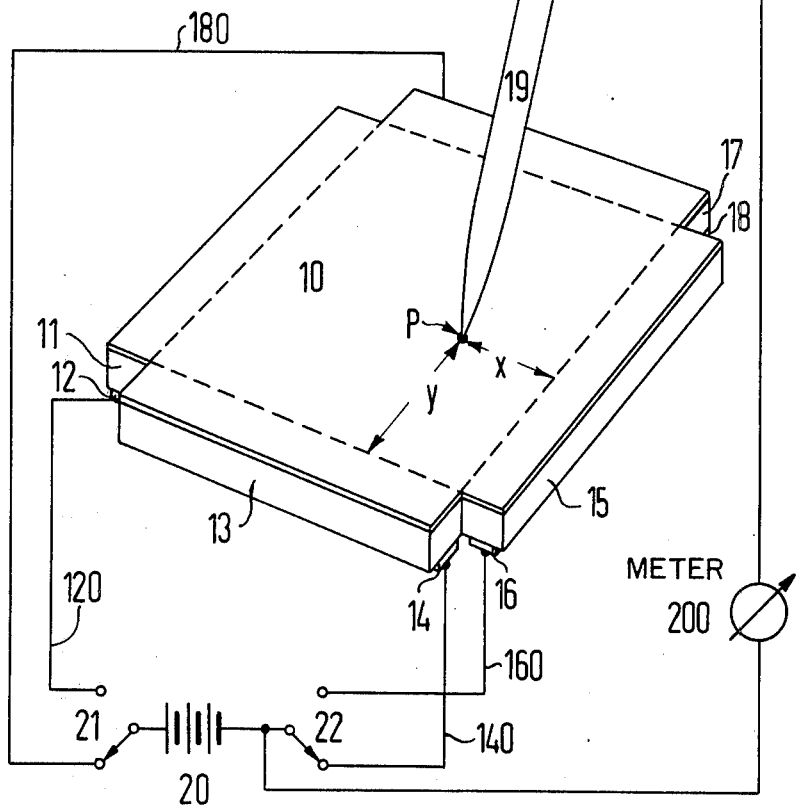

DEVICE FOR THE ELECTRICAL DETERMINATION OF TWO-DIMENSIONAL CO-ORDINATES OF A POINT

BACKGROUND OF THE INVENTION

1. Field of the Invention

This invention relates to a device for the electrical determination of two-dimensional coordinates of a point, and more particularly to such a device in which a plate in the form of a resistance layer comprising a material having a given resistance characteristic carries contact strips, two of which strips may be, in each case, connected to different potentials of an electric voltage source and a potential which may be tapped at a point of the plate by means of a scanning device represents a gauge for the relative position of the point in relation to the contact strips.

2. Description of the Prior Art

A fundamental example of a typical device includes a plate which comprises a material having a high electrical resistance. Contact strips are arranged at the edges of the plate with a first pair of contact strips on the first parallel edges of the plate and a second pair of contact strips on other parallel edges of the plate perpendicular thereto. These contact strips can be connected to the poles of a voltage source so that, for example, a pair of contact strips have a voltage difference U in relation to one another. Consequently, there is a voltage difference $U_1$ between a point on the plate and one of the two strips. This difference can be tapped with a scanning device, e.g. by means of a scanning probe. The voltage difference $U_1$ represents a gauge for the relative position of the point in relation to the pair of contact strips. The device therefore operates in the manner of a potentiometer in which a resistance R has the voltage U applied thereto. The voltage $U_1$ can be tapped from a portion $R_1$ of the resistance R in accordance with the expression $$U_1 = U \cdot R_1/R.$$

Such a device involves the difficulty that the tapped potentials do not depend linearly upon the coordinates of a point on the plate. At a point which possesses the same distances from the contact strips of a first pair of strips, but which, however, lies closer to the contact strips of the second pair of strips, a different voltage difference is tapped. This effect occurs in that the contact strips of a second pair act as interferences, because of their high electrical conductivity, when the distance of the point from the first pair of contact strips is to be scanned. All the points of the plate in the vicinity of the second pair of contact strips carry approximately the same potential. If, however, contact strips having a high electrical resistance are used, the equivalent of a plate is formed which is contacted at points at four positions so that the potential tapped at the point in question also does not depend in a linear fashion upon the coordinates of that point.

SUMMARY OF THE INVENTION

The object of the invention is to provide a device in which the potentials tapped from a point of the plate depend in a linear fashion upon the coordinates of the point.

This object is realized by the provision of a device of the type described above which is designed in accordance with the invention to include varistor layers arranged between the contact strips and the plate and through the utilization of one or more voltage sources the varistor layers can be connected to a voltage which is greater than a threshold voltage at which the varistor layers pass from a state of low electrical conductivity into a state of greatly increased electrical conductivity.

The invention exploits the irregular dependence of the electrical conductivity of a varistor upon the voltage connected to the varistor. If the voltage connected to the varistor is below the so-called threshold voltage of the varistor, the varistor has a very high electrical resistance. Above this threshold voltage, the varistor has a considerably reduced resistance. In the region of the threshold voltage, in the event of an increase in the voltage by approximately 10%, the conductivity of the varistor changes by a factor of 100.

Preferably, the varistor layers are designed in such a manner that below the threshold potential the layers have a substantially lower conductivity than the plate, but above the threshold voltage the layers have a substantially higher conductivity than the plate.

BRIEF DESCRIPTION OF THE DRAWINGS

Other objects, features and advantage of the invention, its organization, construction and operation will be best understood from the following detailed description, taken in conjunction with the accompanying drawings, on which:

FIG. 3 is a sectional view of a device constructed in accordance with the invention;

FIG. 4 is a schematic representation of a device constructed in accordance with the invention and the application of the device.

DESCRIPTION OF THE PREFERRED EMBODIMENTS

Figure 1:
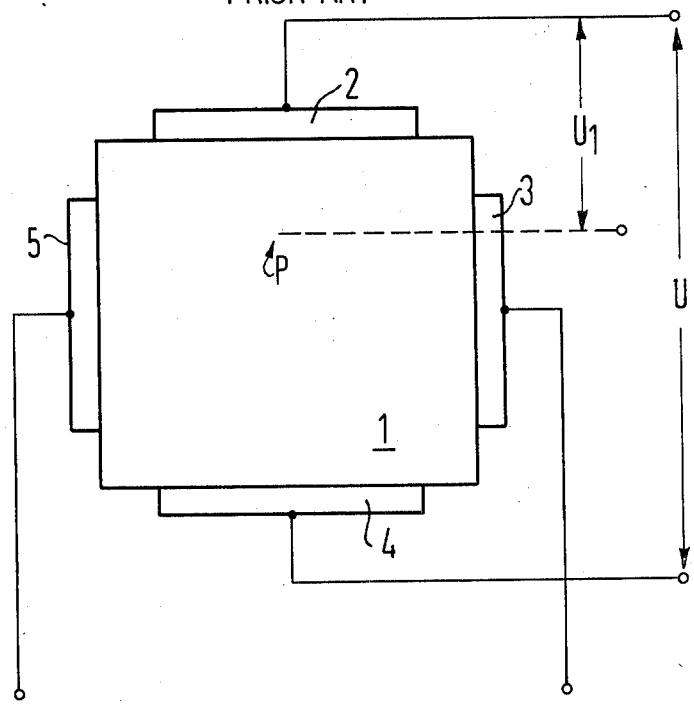
FIG. 1 is a plan view of a basic example of a prior art device.
Figure 2:
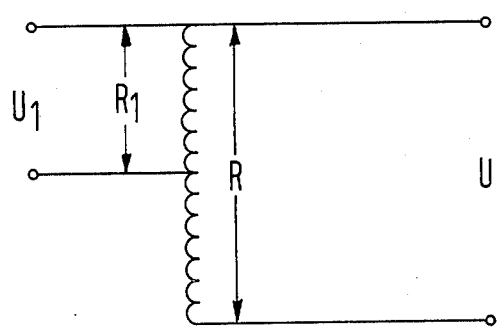
FIG. 2 is an approximate equivalent circuit for a pair of contact strips and the resistance material therebetween to illustrate voltage tapping of the device illustrated in FIG. 1.

Referring to FIG. 1, a basic example of a typical device known in the art is illustrated as comprising a plate 1 which comprises a material having a high electrical resistance. A plurality of contact strips 2–5 are arranged about the plate 1 along its edges. These contact strips can be connected to the poles of a voltage source (not illustrated) so that, for example, the contact strips 2 and 4 have a voltage difference U in relation to one another. Consequently, there is a voltage difference $U_1$ between the point P on the plate and the contact strip 2. This difference $U_1$ can be tapped with a scanning device, e.g. by means of a scanning probe. The voltage difference $U_1$ represents a gauge for the relative position of the point P in relation to the contact strips 2 and 4. The device thus operates as a potentiometer as illustrated in FIG. 2. In FIG. 2 an approximate equivalent circuit of the apparatus of FIG. 1 is illustrated in which a resistance R has a voltage U applied thereto. Then, the voltage $U_1$ can be tapped from a portion $R_1$ of the resistance R in accordance with the expression $$U_1 = U \cdot R_1/R.$$

As explained above, such a device involves difficulty that the tapped potentials do not depend linearly upon the coordinates of a point on the plate. At a point which possesses the same distances from the contact strips 2 and 4 as the point P, but which, however, lies closer to the contact strip 3 and the contact strip 5, a different voltage difference is tapped. This effect occurs in that the contact strips 3 and 5 act as interferences, on account of their high electrical conductivity, when the distance of the point P from the contact strips 2 and 4 is to be scanned. All of the points of the plate in the vicinity of these contact strips 3 and 5 carry approximately the same potential. If, however, contact strips having a high electrical resistance are employed, this is equivalent to a plate which is contacted at points at four positions so that the potential tapped at the point P also does not depend in a linear fashion upon the coordinates of the point P. Referring to FIG. 3, a plate 10, in the form of an electrical resistance layer, is arranged on a substrate 6 consisting of an insulating material, e.g. glass. The electrical resistance layer comprises, for example, SnO, and therefore, like the glass, is transparent. At the edge of the plate 10 is arranged a varistor layer 11 which comprises, for example, zinc oxide. Arranged on this varistor layer is a contact strip 12 which can, for example, be produced as a baked-in metallization. A cable for connection to a voltage source can be applied to the contact strip 12 as indicated in FIG. 3.

FIG. 4 illustrates an overall view of a device constructed in accordance with the invention. A plate 10 carries a plurality of varistor layers 11, 13, 15 and 17 with respective contact strips 12, 14, 16 and 18 carried on the varistor layers in the manner illustrated in FIG. 3. The contact strips 12, 14, 16 and 18 can be connected to a voltage source 20 by way of supply lines 120, 140, 160 and 180. The contact strips located opposite one another are each connected to this voltage source. In FIG. 4, the contact strips 14 and 18 are connected to the voltage source by way of a pair of switches 21 and 22. This voltage source must have a voltage which is greater than the threshold voltage of the varistor layers 13 and 17. This is ensured if the voltage of the voltage source is greater than $2U_e + U_r$. Here $U_e$ is the voltage which must occur across a varistor layer in order that the varistor layer should be in the state of high electrical conductivity, and $U_r$ is the voltage which drops across the plate on the path from a varistor layer to an oppositely located varistor layer. The surface resistance of the plate must be selected to be such that the value $U_r$ is smaller than the value $2U_e$. It is therefore ensured that the varistor layers, in FIG. 4 of the layers 11 and 15 which are not connected to the voltage source, remain in the state of low conductivity. As long as these varistor layers possess a lower degree of conductivity than the plate, the layers do not produce any distortion of the electrical potential gradient within the plate. By means of a scanning device 19, in FIG. 4 illustrated as a scanning probe which is connected to a line 190 and a voltage meter 200 to one pole of a voltage source 20, the voltage difference between the point P and the one pole of the voltage source can be measured. The values between the value $U_e$ and the value $U_e + U_r$ are obtained. If the contact strips are, as illustrated in FIG. 4, connected to the voltage source, the scanned value of the voltage difference is proportional to the y-coordinate of the point P.

If the contact strips 12 and 16 are connected to the voltage source, the scanned value is proportional to the x-coordinate of the point P.

Figure 5:
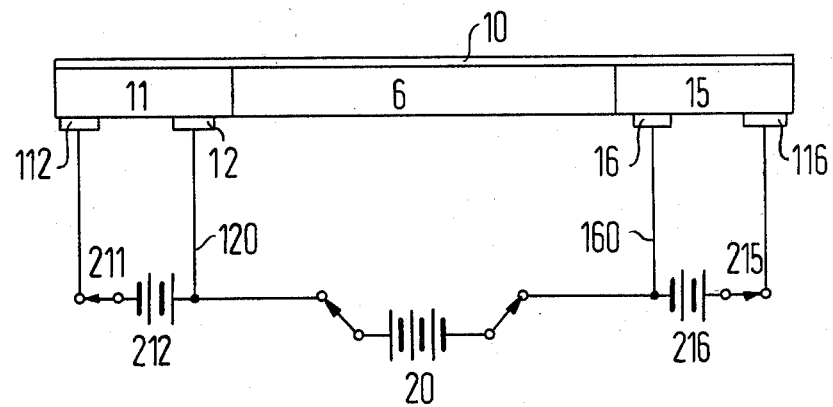
FIG. 5 illustrates a particularly preferred embodiment of the invention.

FIG. 5 illustrates a sectional diagram of a particularly preferred embodiment of the invention. Corresponding elements have been given the same reference characters as in FIGS. 3 and 4. In FIG. 5, the varistor layers each have two contact strips—the varistor layer 11 has the contact strips 12 and 112, the varistor layer 15 has the contact strips 16 and 116. Voltage sources 212 and 216 are connected between the two contact strips of each varistor layer by way of a pair of switches 211 and 215. The varistor layers can be connected to a voltage which is greater than the threshold voltage of the varistor layers by way of these voltage sources so that the varistor layers become highly conductive. The distance between the contact strips of each varistor layer is to be greater than $2d$, where $d$ is the thickness of the varistor strip. The voltage of the voltage sources 212 and 216 must be greater than $2U_v$, where $U_v$ is the threshold voltage which is dependent upon the thickness of the varistor layer.

An advantage of this arrangement is that even in the case of relatively small voltages of the voltage sources 212 and 216, the high current flows within the connected varistor layers so that the varistor layers are in a state of very high conductivity.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a device for the electrical determination of two-dimensional coordinates of a point on a plate with a scanning device which contacts the plate, and in which the plate comprises a resistance layer of a material having a given electrical resistance, and in which pairs of contact strips are arranged on the plate, each strip of a pair of strips being connected to a respective pole of an electrical voltage source, and in which a potential is tapped at the contact point of the plate and the scanning device and represents a gauge for the relative position of the contact point in relation to the contact strips, the improvement therein comprising:
   varistor layers between the contact strips and the plate, and
   at least one voltage source for connection to the varistor layers for providing a voltage thereto which is greater than a threshold voltage at which the varistor layers pass from a state of low electrical conductivity into a state of greatly increased electrical conductivity.

2. The improved apparatus of claim 1, wherein said varistor layers have a conductivity characteristic such that in a low conductivity state the conductivity thereof is lower than the conductivity of the plate and in the high conductivity state the conductivity thereof is higher than the conductivity of the plate.

3. The improved apparatus of claim 1 wherein said varistor layers consist of zinc oxide.

4. The improved apparatus of claim 1 wherein said plate consists of a transparent material.

5. The improved apparatus of claim 1 wherein said plate consists of SnO, and further comprising a substrate consisting of glass and carrying said plate.

6. The improved apparatus of claim 1, wherein said plate is generally rectangular, said varistor layers are disposed at edges of the plate and each carry at least one contact strip which extends at least approximately over the entire length of the respective varistor layer, and comprising switches for connecting, in each case, two contact strips of two varistor layers located on opposite edges of the plate to a voltage source so that an electrical potential drop occurs within the plate, and a voltage measuring device connected between a reference potential and the scanning device.

* * * * *